2,779,792

PROCESS FOR THE MANUFACTURE OF A POLYENE ALDEHYDE

Otto Isler, Marc Montavon, and Rudolf Ruegg, Basel, and Paul Zeller, Neuallschwil, Switzerland, assignors to Hoffmann-La Roche Inc., Nutley, N. J., a corporation of New Jersey No Drawing. Application July 6, 1954,
Serial No. 441,654

Claims priority, application Switzerland July 10, 1953

9 Claims. (Cl. 260—601)

This invention relates to a process for the preparation of hitherto unknown polyene dialdehydes, which comprises acetalising an unsaturated 2:7-dimethyl-octane dial having three conjugated multiple bonds between the aldehyde groups, condensing the obtained diacetal with 2 moles of a vinyl ether in the presence of an acidic condensing agent, and treating the obtained condensation product with acid to cause hydrolysis and elimination of alcohol in order to form the corresponding unsaturated 4:9-dimethyl-dodecane dial.

The obtained polyene dialdehydes, i. e. 4:9-dimethyl-dodecatetraen-(2:4:8:10)-yn-(6)-dial-(1:12) and 4:9-dimethyl-dodecapentaen-(2:4:6:8:10)-dial-(1:2), hereinafter referred to as $C_{14}$ dialdehydes, are valuable intermediates for the synthesis of polyene dyestuffs. Thus, the Reformatsky reaction results in the formation of dehydrocrocetin and crocetin when using 2 moles of α-bromo-propionic acid ester with subsequent elimination of water and saponification. By acetalising the $C_{14}$ dialdehydes, condensing the formed acetals with 2 moles of propenyl ether and treating the condensation products with acid, dehydrocrocetin dialdehyde and crocetin dialdehyde are formed. In the Reformatsky reaction of dehydrocrocetin dialdehyde and crocetin dialdehyde, respectively, with bromo-acetic ester with subsequent elimination of water, "all-trans" dehydrobixin ester and "all-trans" bixin ester, respectively, are formed. When acetalising dehydrocrocetin dialdehyde and crocetin dialdehyde, respectively, condensing the so obtained acetal with 2 moles of vinyl ether and treating the condensation products with acid, dehydrobixin dialdehyde and bixin dialdehyde, respectively, are formed. In the Grignard reaction of dehydrobixin dialdehyde and bixin dialdehyde, respectively, with two moles of 2-methyl-6-bromo-hepten-(2) with subsequent elimination of water, dehydrolycopene and lycopene, respectively, are formed.

In the preferred embodiment of the present invention, 2:7-dimethyl-octadien-(2:6)-yn-(4)-dial-(1:8) [$C_{10}$ dialdehyde] is acetalised, the obtained 2:7-dimethyl-octadien-(2:6)-yn-(4)-diacetal-(1:8) [$C_{10}$ diacetal] is condensed with a vinyl ether in the presence of an acidic condensing agent, and the so obtained 4:9-dimethyl-dodecadien-(4:8)-yn-(6)-diether-(3:10)-diacetal-(1:12) [$C_{14}$ diether acetal] is treated with acid to cause hydrolysis and elimination of alcohol from the positions 2:3 and 10:11 in order to form 4:9-dimethyldodecatetraen-(2:4:8:10)-yn-(6)-dial-(1:12) [$C_{14}$ dialdehyde].

The first step of the process according to the present invention consists in acetalising the $C_{10}$ dialdehyde. This is carried out in a manner known per se. Thus, the acetalisation is carried out, for example, by means of an ortho-ester in the presence of an acidic condensing agent such as p-toluene sulfonic acid, phosphoric acid BF₃-etherate, $ZnCl_2$, $NH_4Cl$, $NH_4NO_3$, and the like. The ortho-esters of lower aliphatic acids with lower aliphatic alcohols, preferably the methyl, ethyl, or n-butyl ortho-formates, are particularly convenient for the said purpose. The obtained acetals of the $C_{10}$ dialdehydes are colorless oils having two absorption maxima in the ultra-violet spectrum at 273 mμ and 288 mμ. No particular purification, for example by distillation, is necessary prior to the further treatment of the said acetals.

In the second step the above described $C_{10}$ diacetal is condensed with a vinyl ether in the presence of an acidic condensing agent to form the $C_{14}$ di-etheracetal. Condensing agents which can be used for this condensation are $BF_3$-etherate, $ZnCl_2$, $TiCl_4$, $AlCl_3$, $FeCl_3$, $SnCl_4$ etc. It is convenient to use the vinyl ether of the same alcohol with which the $C_{10}$ dialdehyde has been acetalised, for example methyl vinyl ether, ethyl vinyl ether, or n-butyl vinyl ether. The condensation is carried out at as low a reaction temperature as possible. In this manner undesired side reactions such as polymerisation and condensation of the formed $C_{14}$ di-etheracetal with vinyl ether can be avoided. Depending on the particular condensing agent and the particular $C_{10}$ diacetal and vinyl ether used for the condensation the optimum reaction temperature is comprised between 25° and 60° C. In the preferred embodiment two molecular proportions of the vinyl ether are reacted with the diacetal in the presence of boron trifluoride etherate or of zinc chloride at 25° to 50° C. In this manner substantially pure $C_{14}$ di-etheracetals are obtained in an almost quantitative yield. These compounds are colorless oils showing two absorption maxima in the ultra-violet spectrum at 273 to 274 mμ and 288 to 290 mμ. No particular purification, for example by distillation, is necessary prior to the further treatment of these products.

The third step consists in hydrolysing the $C_{14}$ di-etheracetals in an acidic medium by a method known per se, whereby the $C_{14}$ dialdehyde is formed by simultaneous elimination of alcohol from the positions 2:3 and 10:11. This reaction step can conveniently be carried out in the presence of water-soluble, non-volatile organic or inorganic acids such as p-toluene sulfonic acid, acetic acid, propionic acid, oxalic acid, sulfuric acid, phosphoric acid, or in the presence of water-soluble acid salts such as $ZnCl_2$ and $NaHSO_4$. It is advantageous to exclude oxygen from the reaction and to operate under such conditions that the alcohol being formed during the reaction is continuously distilled off from the reaction mixture. A water-miscible solvent such as dioxane, tetrahydrofurane, ethylene glycol dimethyl ether etc., may be added to the reaction mixture in order to obtain a homogeneous mixture. Preferably, the $C_{14}$ di-etheracetal is either heated with phosphoric acid in the presence of a water-miscible solvent to about 100° C., the alcohol formed during the reaction being continuously removed from the reaction mixture, or boiled with acetic acid with addition of alkali acetate and some water, the alcohol formed during the reaction being combined in the form of acetic acid ester. On dilution of the reaction mixture with water the crystalline $C_{14}$ dialdehyde separates, which can be purified by recrystallisation, for example from ethyl alcohol or chloroform, or by sublimation. In order to prevent losses of substance due to polymerisation and decomposition, it is recommended to avoid temperatures exceeding 120° C. throughout the process and, in particular, to use the intermediates, i. e. the $C_{10}$ diacetal and $C_{14}$ di-etheracetal, in an undistilled form in the next step.

The so obtained $C_{14}$ dialdehyde [4:9-dimethyldodeca-tetraen - (2:4:8:10) - yn - (6) - dial - (1:12)] melts at 165° C. and shows two absorption maxima in the ultra-violet spectrum at 371 mμ, ε=53,500, and at 391 mμ, ε=51,700 (in conc. ethanol). By partial hydrogenation of the triple bond, which can be carried out by reaction with one mole of hydrogen in the presence of a palladium-lead catalyst, 4:9-dimethyldodecapentaen-(2:4:6:8:10) - dial - (1:12) is formed. The cis - form formed at first in the catalytic hydrogenation can be converted into the "all-trans" form by the action of light, heat or iodine.

This "all-trans" form of 4:9-dimethyldodecapentaen-(2:4:6:8:10)-dial-(1:12) is also formed, as mentioned above, in the process according to the present invention, if 2:7 - dimethyloctatrien - (2:4:6) - dial - (1:8) of M. P. 161.5 to 162° C. is used as starting material which itself can be obtained from 2:7-dimethyloctadien-(2:6)-yn-(4)-dial-(1:8) by the action of one mole of hydrogen in the presence of a palladium-lead catalyst and heating the hydrogenation product.

EXAMPLE

$C_{10}$ diacetal

To a hot solution of 40 parts by weight of 2:7-dimethyl - octadien - (2:6) - yn - (4) - dial - (1:8) in 120 parts by weight of ethyl ortho-formate a hot solution of 4 parts by weight of ammonium nitrate in 50 parts by volume of absolute alcohol is added and the mixture is allowed to stand for 48 hours, the mixture then gradually reaching room temperature. Then the reaction mixture is taken up in ether, washed with sodium bicarbonate solution and dried over potassium carbonate. After concentration of the ether solution the excess of ethyl ortho-formate as well as the formed ethyl formate are removed in vacuo from the condensation product. By distillation in a high vacuum there is obtained pure 2:7 - dimethyloctadien - (2:6) - yn - (4) - tetraethyldiacetal-(1:8) of B. P. 122 to 127° C. at 0.03 mm.; $n_D^{24°}$ 1.4892; ultra-violet maxima: 273 m$\mu$, $\epsilon=27,200$, and 288 m$\mu$, $\epsilon=22,600$ (in conc. ethanol).

$C_{14}$ di-etheracetal

To 102 parts by weight of 2:7-dimethyloctadien-(2:6)-yn-(4)-tetraethyldiacetal-(1:8) and 0.5 part by volume of BF$_3$-etherate, 47 parts by weight of ethyl vinyl ether are gradually added, while stirring. The rate of addition is so adjusted that the reaction temperature is maintained between 30° and 35° C. The mixture is stirred for a further 3 hours at 35° C. and is then taken up in ether, washed with diluted sodium hydroxide solution and dried over potassium carbonate. After concentration of the ether solution 137 parts by weight of crude 4:9 - dimethyldodecadien - (4:8) - yn - (6) - diethoxy - (3:10) - tetraethyldiacetal - (1:12) are obtained. The compound purified by distillation in a high vacuum boils at 160–161° C. at 0.03 mm; $n_D^{29°}$ 1.4778; ultra-violet maxima: 274 m$\mu$, $\epsilon=26,200$, and 290 m$\mu$, $\epsilon=23,400$ (in conc. ethanol).

$C_{14}$ dialdehyde

For hydrolysing the above diacetal the crude 4:9-dimethyldodecadien - (4:8) - yn - (6) - diethoxy - (3:10)-tetraethyldiacetal-(1:12) is dissolved in a mixture of 800 parts by volume of dioxane, 200 parts by volume of water and 35 parts by volume of 87% phosphoric acid, and traces of hydroquinone are added thereto. The mixture is boiled for 7 hours under a nitrogen atmosphere, during which period a mixture of dioxane, alcohol and water is slowly distilling off through a column packed with Raschig rings. The reaction volume is maintained constant by dropwise addition of a mixture of dioxane and water. The hot reaction mixture is then poured with stirring onto about 2000 parts by volume of ice water, the 4:9 - dimethyldodecatetraen - (2:4:8:10) -yn- (6) - dial - (1:12) immediately precipitating in a crystalline form. The precipitate is sucked off and well washed with water. After recrystallisation from ethyl alcohol and drying in vacuo 45 parts by weight of the pure compound of B. P. 165° C. are obtained.

What we claim is:

1. A process which comprises reacting a compound having the formula

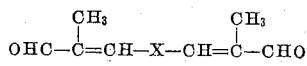

wherein X represents a bivalent radical selected from the group consisting of —C≡C— and —CH=CH— with a tri(lower alkyl) ester of a lower ortho-alkanoic acid in the presence of an acidic condensation agent to produce a compound having the formula

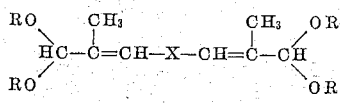

wherein X has the same meaning as above, and each R represents a lower alkyl radical; reacting the latter compound with vinyl lower alkyl ether in the presence of an acidic condensation agent to produce a compound having the formula

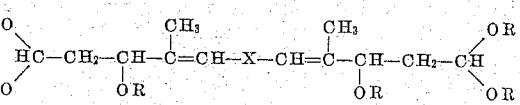

wherein X has the same meaning as above, and each R represents a lower alkyl radical; and hydrolysing the latter compound in aqueous acidic medium to produce a compound having the formula

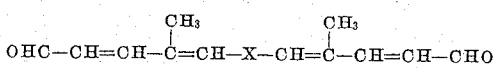

wherein X has the same meaning as above.

2. A process which comprises reacting a compound having the formula

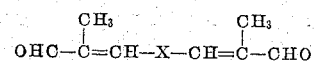

wherein X represents a bivalent radical selected from the group consisting of —C≡C— and —CH=CH— with a tri(lower alkyl) ester of a lower ortho-alkanoic acid in the presence of an acidic condensation agent to produce a compound having the formula

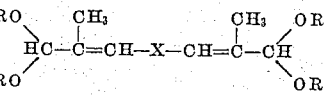

wherein X has the same meaning as above and each R represents a lower alkyl radical.

3. A compound having the formula

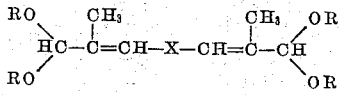

wherein X represents a bivalent radical selected from the group consisting of —C≡C— and —CH=CH—, and each R represents a lower alkyl radical.

4. A process which comprises reacting a compound having the formula

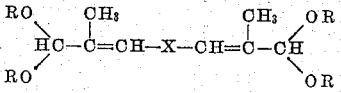

wherein X represents a bivalent radical selected from the group consisting of —C≡C— and —CH=CH—, and each R represents a lower alkyl radical with vinyl lower alkyl ether in the presence of an acidic condensation agent to produce a compound having the formula

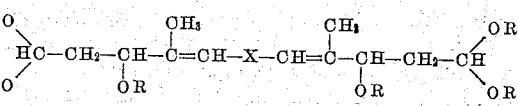

wherein X represents a bivalent radical selected from the group consisting of —C≡C— and —CH=CH—, and each R represents a lower alkyl radical.

5. A compound having the formula

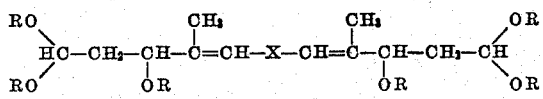

wherein X represents a bivalent radical selected from the group consisting of —C≡C— and —CH=CH—, and each R represents a lower alkyl radical.

6. A process which comprises hydrolyzing a compound having the formula

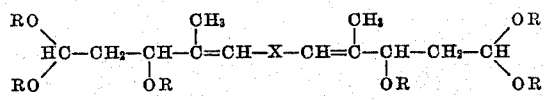

wherein X represents a bivalent radical selected from the group consisting of —C≡C— and —CH=CH—, and each R represents a lower alkyl radical in aqueous acidic medium to produce a compound having the formula

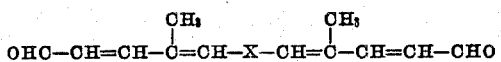

wherein X represents a bivalent radical selected from the group consisting of —C≡C— and —CH=CH—.

7. A compound having the formula

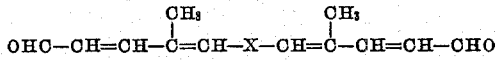

wherein X represents a bivalent radical selected from the group consisting of —C≡C— and —CH=CH—.

8. 4:9 - dimethyl - dodecatetraen - (2:4:8:10) - yn-(6)-dial-(1:12).

9. 4:9 - dimethyl - dodecapentaen - (2:4:6:8:10) - dial-(1:12).

No references cited.